Figure 1A:
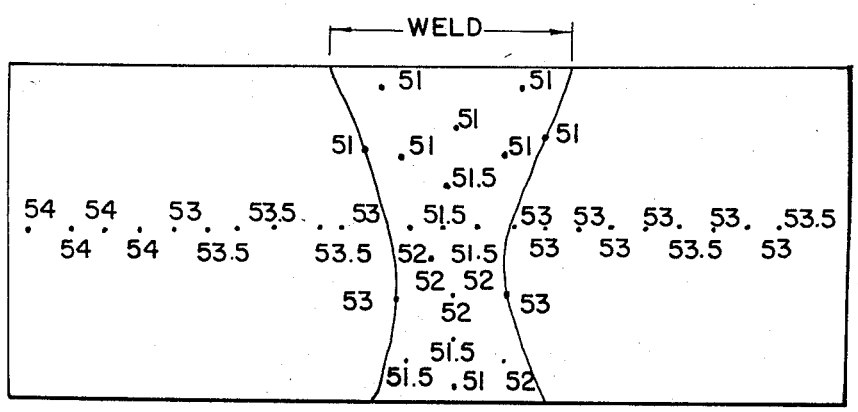

March 4, 1969

R. E. KEY 3,431,102

FUSION WELDING FILLER METAL WITH CHROMIUM NICKEL
AND VANADIUM ALLOYING ELEMENTS

Filed Oct. 20, 1966

1" PLATE THICKNESS

.5" PLATE THICKNESS

RUPERT E. KEY
*INVENTOR.*

BY *Charles E. Woodward*

ATTORNEY

United States Patent Office 3,431,102
Patented Mar. 4, 1969

3,431,102
FUSION WELDING FILLER METAL WITH CHROMIUM NICKEL AND VANADIUM ALLOYING ELEMENTS
Rupert E. Key, Fort Worth, Tex., assignor to General Dynamics Corporation, Fort Worth, Tex., a corporation of Delaware
Filed Oct. 20, 1966, Ser. No. 588,027
U.S. Cl. 75—128                                  3 Claims
Int. Cl. C22c 39/26, 39/20, 39/50

The present invention relates generally to a novel steel filler metal alloy for utilization in fusion welding of low alloy, deep hardening, high strength steels, particularly D6ac steel.

More specifically, the present invention relates to a vacuum melted steel filler alloy material requiring low initial preheat and having good weldability characteristics during welding and extremely low crack susceptibility during the subsequent weld cooling cycle, as well as excellent postweld zone heat treat response permitting the achievement of the desired high weld joint efficiency and good mechanical properties.

Presently the state of the art welding processes employ a weld filler metal of approximately the same chemistry of composition as the base metal type. This is done in an attempt to retain the superior mechanical properties obtainable from a steel such as Ladish D6ac. Although these all important mechanical properties can be achieved by the utilization of such a filler metal, an associated high crack sensitivity results due to the internal stresses which occur during the weld cooling cycle, such stresses being developed as the material undergoes the transformation from austenite to martensite. Martensite has an inherently brittle crystalline structure, as well as severe internal stresses which are due to the intrinsic increase in volume associated with the austenite to martensite transformation. Obviously, the high crack susceptibility significantly reduces fatigue life and results in poor reliability which cannot be tolerated in highly stressed structures, such as those encountered in airframe manufacture.

In an attempt to overcome this major shortcoming, a weld filler metal such as Timken Steel Company 17–22A(s) has previously been employed by the industry, by which employment the crack sensitivity problem could be materially reduced. This metal exhibited excellent weldability, and developed bainite during cooling after the welding, which is a more ductile phase than martensite. However, the 17–22A(s) material, due to its low carbon content, did not respond to subsequent heat treating; therefore, the necessary mechanical properties within the weld zone could not be obtained, resulting in unacceptably low weld joint efficiency.

The problem with the relatively high carbon filler metal, such as D6ac, was found to be that long slow-cooling rates were required to achieve a quasi-bainite phase due to the low alloy content of the metal. Further, a preheat temperature above the 560° F. martensite-start temperature was required to induce more residual heat into the parts to be welded. Such a preheat was employed to obtain a slower cooling rate in an effort to attain bainite, and was necessary because the mass of the parts which were being welded materially increased the rate of cooling due to the inherent heat sink created by these cold parts, which in turn engendered the formation of the undesirable martensitic structure.

In order to obviate the shortcomings of the prior art filler material alloys, the present filler metal alloy of the invention incorporates sufficient carbon to allow good heat treat response, but at the same time has the other alloy contents requisite to bring the bainite nose closer to the vertical axis of the applicable isothermal transformation diagram, thus permitting the formation of the highly desired bainite phase and its associated good weldability characteristics. This specific combination also permits the utilization of a lower initial preheat, thus requiring less dissipation of residual heat, thereby decreasing the over-all cooling rate while still permitting the transformation of austenite to bainite.

The present invention obviates crack susceptibility while maintaining a high degree of heat treatability by utilization of a filler wire composition which engenders the formation of bainite rather than martensite during the cooling portion of the weld cycle. The desired bainite transformation is accomplished through three metallurgical mechanisms; by controlling the composition or chemistry of the filler wire so it will engender the formation of the bainite; by using a suitable preheat temperature to cause the cooling ratio of the weld to be such as to allow formation of bainite in the weld area; and by developing a slight and gradual carbon gradient decreasing from base metal into the weld metal. Thus, the invention resides in the provision of a novel filler alloy to be used for fusion weld joints in D6ac and related steel alloys, the chemistry of the alloy being such that a heat treat response approximately equivalent to that of the base metal is maintained while the related crack susceptibility of the base metal type filler alloy is eliminated.

It is therefore the object of the present invention to provide a weld filler metal having an alloy composition permitting transformation of austenite to bainite, while permitting a low initial preheat, decreased cooling cycle time, and one which in addition attains acceptable heat treat response, hence good weld joint efficiency and associated good mechanical properties.

Figure 1B:
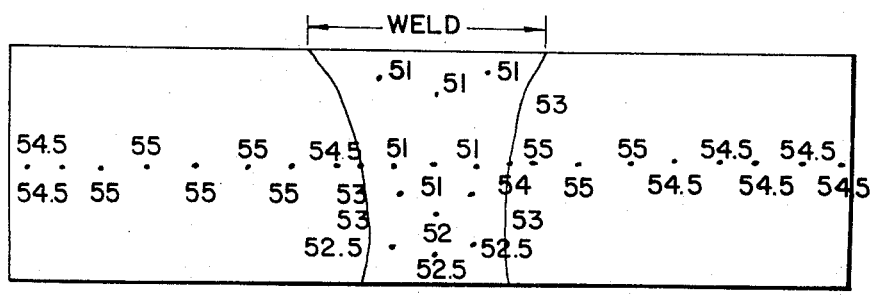

The practice of the present invention will be apparent to those skilled in the art when considering the following specification taken in conjunction with the drawing, wherein:

FIGURE 1 shows typical test samples of D6ac steel plates of 1 inch and ½ inch thicknesses, revealing the hardness readings of a weld zone in which the present inventive weld filler metal was employed.

In general, the carbon content of the invention alloy is lower than either D6 steel or the prior art filler alloys available, allowing a small amount of carbon of the base metal to diffuse into the weld. The general type range is between 0.35 and 0.39% by weight, which develops a slight carbon gradient from base metal to weld metal and helps to reduce any sharp difference in microstructures developed at the weld-base metal junction during welding, cooling from welding, or in subsequent heat treatment. The slightly lower carbon content also helps the weld metal to develop bainite during cooling from the welding operation.

The alloy content of the novel filler also has a smaller percentage of molybdenum than D6ac and related low-alloy, high-strength steels, the general range being from 0.65 to 0.85% by weight. This reduction in molybdenum decreases the incubation time for complete transformation to the bainite phase, and is important in that it prevents the formation of martensite during the normal welding thermal cycle, thereby permitting the employment of a preheat below the martensite-start temperature.

Thus, a preheat temperature of only 350° F. is required to gas tungsten arc-weld D6ac steel with the inventive filler. There are several advantages of such a low preheat temperature. First, the tendency to "hot" crack when the weld pool is solidifying is reduced. This is accomplished by reducing the time the weld zone is in the "hot" cracking zone (2300° F. to the melting temperature of the steel). Second, the lower preheat reduces oxidation and contamination of the weld zone. The oxidation and contamination problem is extremely troublesome in multi-pass welding where each layer of nuggets oxidizes prior to the next weld pass. Third, preheating to only 350° F. minimizes the size of the fusion zone and, therefore, minimizes over-all distortion.

The lower preheat additionally encourages a narrower weld than was previously possible because the width of fusion is related to the total thermal energy within the zone. The lower preheat temperature decreases welder discomfort and promotes higher quality workmanship, and such a preheat level is considerably more economical because the thermal cycle time is reduced and tooling life is extended.

In addition to the reduction in molybdenum, there is a relatively high silicon content, the general range in percent by weight being from about 0.35 to 0.50%. This increase in silicon tends to deoxidize the weld metal and increases fluidity, thereby helping to produce a better over-all weld.

Subsequent to welding, the weld metal responds to heat treatment in substantially the same manner as the base metal. This is accomplished by maintaining a balance in chromium, molybdenum and vanadium in the ranges hereafter specified between the weld metal and base metal. These three elements are responsible for the suppressed pearlite transformation and deep broad austenitic bay region of the standard D6ac isothermal transformation diagram. The composition of this inventive filler wire is shown in the following table:

TABLE I

|  | General | Preferred | Specific |
| --- | --- | --- | --- |
| C | .34–.39 | .36–.38 | .36 |
| Mn | .53–.75 | .66–.68 | .68 |
| P | 1 .008 | 1 .008 | 1 .008 |
| S | 1 .008 | 1 .008 | 1 .008 |
| Si | .35–.50 | .38–.40 | .38 |
| Cr | 1.00–1.20 | 1.18–1.20 | 1.20 |
| V | .14–.25 | .18–.22 | .22 |
| Mo | .65–.85 | .70–.72 | .72 |
| Ni | .20–.40 | .35–.37 | .35 |

1 Maximum.

|  | P.p.m. |
| --- | --- |
| Oxygen | 12.0 |
| Nitrogen | 34.0 |
| Hydrogen | 0.9 |
| Fe | Remainder |

A weld filler alloy comprised as in the preceding table permits mechanical properties comparable to the properties of the base metal, thus maintaining the desirable characteristics of the base metal while eliminating the crack susceptibility otherwise encountered.

An exhaustive study of the weld filler metals of the prior art revealed that although cracking in D6ac steel could be eliminated by employment of a more ductile weld filler metal, such as the prior mentioned 17–22A(s) composition of Timken Steel Company, extremely poor joint efficiency resulted. The ductile weld filler material, which has too low a carbon content, did not adequately respond to heat treatment after welding.

The present invention overcomes these and other adverse characteristics of the prior art. Table II below shows the joint efficiency attained by the filler metal of the present invention for both 220 to 240 K s.i. ultimate tensile strength and 260 to 280 K s.i. ultimate tensile strength upon subsequent heat treating:

TABLE II

| Specimen No. | Plate thickness (in.) | Control, UTS, K s.i. | Weld, UTS, K s.i. | Joint effective percentage |
| --- | --- | --- | --- | --- |
| 220–240 UTS, K s.i. range: | | | | |
| L1 | .500 | 228.6 | 223.9 | 97.9 |
| L2 | .500 | 227.2 | 222.2 | 97.8 |
| L3 | 1.000 | 221.9 | 215.1 | 97.1 |
| 260–280 UTS, K s.i. range: | | | | |
| L5 | .500 | *286.6 | 269.2 | 93.9 |
| L6 | .500 | 278.9 | 268.8 | 96.4 |
| L7 | 1.000 | 271.3 | 295.4 | 95.6 |
| L8 | 1.000 | 268.5 | 257.5 | 96.0 |

*Loaded to capacity of tensile test machine, load released and specimen machined and loaded again to failure.

FIGURE 1 should be read in conjunction with Table II above, and clearly illustrates the heat treatability of the welds obtained by employing the alloy filter of the present invention. In both instances shown, 1 inch and ½ inch plate D6ac, heat treated to 260 to 280 K s.i., the hardness readings on Rockwell C are shown across the weld joint, and through the weld itself to establish continuity.

As thus described and shown, the present invention comprises a weld filler metal alloy which possesses excellent weldability characteristics, i.e., good fluidity, low crack sensitivity, and a low initial preheat in addition to good subsequent heat treat response and the attendant high weld joint efficiency as well as good mechanical properties and good fatigue life.

I claim:
1. A weld filler metal alloy for use with high strength, low alloy, deep hardening steels which permits superior weldability of such steels, said alloy having the characteristics when used therewith of low crack sensitivity, low preheat requirements, very high heat treat response and characteristics substantially similar to the base weld material following heat treat, consisting in percent by weight of: carbon from about 0.34% to about 0.39%, manganese from about 0.53% to about 0.75%, silicon from about 0.35% to about 0.50%, chromium from about 1.00% to about 1.20%, vanadium from about 0.14% to about 0.25%, molybdenum from about 0.65% to about 0.85%, nickel from about 0.20% to about 0.40%, phosphorous 0.01% maximum, sulfur about 0.01% maximum, and the remainder iron inclusive of minute impurities.

2. A weld filler metal alloy for welding high strength, low alloy steels and characterized by low crack sensitivity, low preheat requirement, and high heat treat response consisting in major part of iron inclusive of minute impurities and in percent by weight of from about 0.36% to 0.38% carbon, from about 0.66% to about 0.68% manganese, from about 0.38% to about 0.40% silicon, from about 1.18% to about 1.20% chromium, from about 0.18% to about 0.22% vanadium, from about 0.70% to about 0.72% molybdenum, from about 0.35% to about 0.37% nickel, and no more than 0.008% phosphorous and 0.008% sulfur.

3. The weld filler metal alloy defined by claim 2 consisting of about 0.36% carbon, 0.68% manganese, 0.38% silicon, 1.20% chromium, 0.22% vanadium, 0.72% molybdenum, 0.35% nickel, phosphorous no more than 0.008% and sulfur no more than 0.008%.

References Cited

UNITED STATES PATENTS

| 1,468,937 | 9/1923 | Armstrong | 75—126 |
| 1,478,738 | 12/1923 | Holsag. | |
| 3,165,402 | 1/1965 | Finkl | 75—128.9 |
| 3,316,084 | 4/1967 | Manganello | 75—128.9 |

HYLAND BIZOT, *Primary Examiner.*